United States Patent [19]
Mukerjee et al.

[11] Patent Number: 5,513,242
[45] Date of Patent: Apr. 30, 1996

[54] METHOD AND APPARATUS FOR FACILITATING THE ULTIMATE MAKING OF WIRELESS DATA TRANSFERS

[75] Inventors: Sandip Mukerjee, Jackson; Ralph J. Snyder, Barnegat, both of N.J.

[73] Assignee: AT&T Corp., Murray Hill, N.J.

[21] Appl. No.: 251,492

[22] Filed: May 31, 1994

[51] Int. Cl.⁶ .................................... H04Q 7/38
[52] U.S. Cl. ............................ 379/58; 379/59; 455/54.1
[58] Field of Search .................... 379/59, 63, 67, 379/88, 89, 58; 455/33.1, 54.1

[56] References Cited

U.S. PATENT DOCUMENTS 5,177,780  1/1993  Kasper et al. ............................ 379/63
5,313,515  5/1994  Allen et al. ............................ 379/59

Primary Examiner—Dwayne D. Bost
Attorney, Agent, or Firm—Eugene J. Rosenthal

[57] ABSTRACT

Unnecessary expenses associated with exchanging data with wireless data stations that have become unavailable are avoided, in accordance with the principles of the invention, by a) transmitting the data to be transmitted to a store and forward unit; b) marking as unavailable a wireless data station to which the store and forward unit could not successfully complete the data transmission; c) waiting for the wireless data station to register, i.e., signal its availability to receive data transmissions; and d) transmitting the data from the store and forward unit to the data station once a registration is received from the wireless data station. Optionally, any data transfers to the wireless data station during this waiting period are queued at the store and forward data unit and no attempt is made to contact the wireless data station over the wireless service provider's network. Furthermore, if the data station shares communication facilities with a wireless voice telephone, any call attempts to the wireless telephone during the waiting period are disallowed, i.e., no attempt is made to contact the wireless telephone over the wireless service provider's network.

15 Claims, 4 Drawing Sheets

METHOD AND APPARATUS FOR FACILITATING THE ULTIMATE MAKING OF WIRELESS DATA TRANSFERS

TECHNICAL FIELD

This invention relates to the making of data transfers between data stations over wireless facilities where one of the data stations may become temporarily unavailable.

BACKGROUND OF THE INVENTION

Wireless data stations may sometimes become unavailable for participation in data transfers. This unavailability may result because the wireless data station is 1) off, 2) out of range, or 3) in an area which cannot be penetrated by the wireless communication signal. Wireless communication signals are often carried over wireless telephone channels. At present, when a wireless data transfer fails, it is the responsibility of the transfer originator to attempt to retry the data transmission at a later time. Often, more than one attempt is necessary before the data transfer can be successfully completed. However, constantly attempting to establish a wireless data transmission to an unavailable wireless data station is wasteful of the resources of the wireless service provider serving the unavailable data station as well as of any other service provider, e.g., interexchange carrier, carrying the data.

SUMMARY OF THE INVENTION

The foregoing problems are overcome by, in accordance with the principles of the invention, a) transmitting the data to be transmitted to a store and forward unit; b) marking as unavailable a wireless data station to which the store and forward unit could not successfully complete the data transmission; c) waiting for the wireless data station to register, i.e., signal its availability to receive data transmissions; and d) transmitting the data from the store and forward unit to the data station once a registration is received from the wireless data station. Optionally, any data transfers to the wireless data station during this waiting period are queued at the store and forward data unit and no attempt is made to contact the wireless data station over the wireless service provider's network. Furthermore, if the data station shares communication facilities with a wireless voice telephone, any call attempts to the wireless telephone during the waiting period are disallowed, i.e., no attempt is made to contact the wireless telephone over the wireless service provider's network.

DETAILED DESCRIPTION

In accordance with the principles of the invention, unnecessary expenses associated with exchanging data with wireless data stations that have become unavailable are avoided by a) transmitting the data to be transmitted to a store and forward unit; b) marking as unavailable a wireless data station to which the store and forward unit could not successfully complete the data transmission; c) waiting for the wireless data station to register, i.e., signal its availability to receive data transmissions; and d) transmitting the data from the store and forward unit to the data station once a registration is received from the wireless data station.

Figure 1:
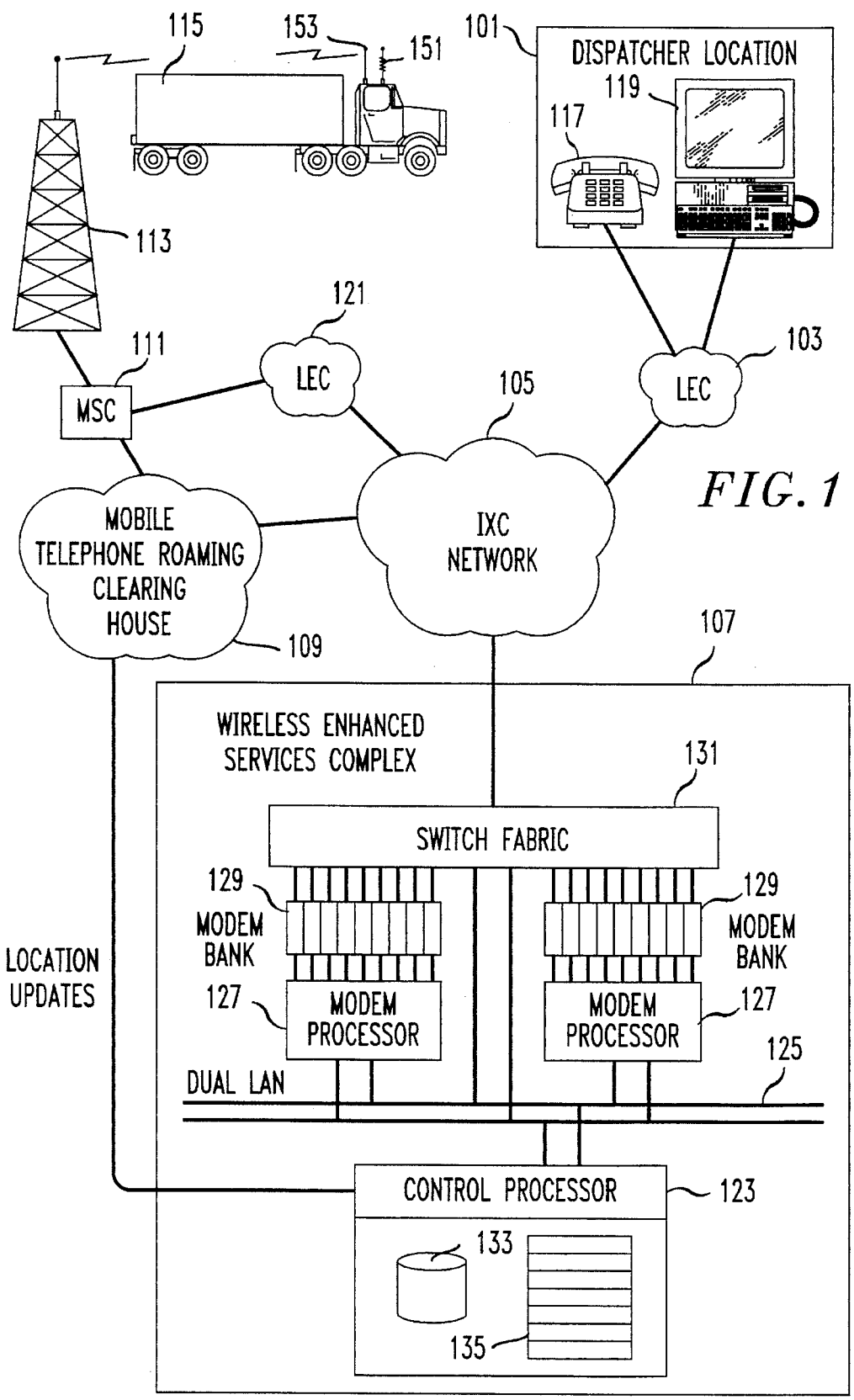
FIG. 1 shows an overview of a truck location and communication system which operates in accordance with the principles of the invention.

Before proceeding directly to a description of a process embodying the invention, it is useful to understand the context in which the invention was developed and in which it is being used, namely, a truck dispatching and control application. Therefore, FIG. 1 shows an overview of a truck location and communication system which affords truck dispatchers 1) the ability to determine the location and other information regarding each truck for which the dispatcher is responsible as well as 2) the ability to communicate with such trucks wherever they are. The truck location and communication system includes a) dispatcher location 101, b) local exchange carriers (LECs) 103 and 121, c) interexchange carrier (IXC) 105, d) wireless enhanced services complex (WESC) 107, e) mobile telephone roaming clearing house 109, f) mobile switching center (MSC) 111, g) mobile base antenna tower 113, and h) truck 115.

Dispatcher location 101 includes telephone 117 and terminal 119, which has a built-in modem. Telephone 117 and terminal 119 are each connected to LEC 103 via respective telephone lines. A dispatcher at dispatcher location 101 uses terminal 119 to view the locations of each truck and exchange data with the trucks. For example, terminal 119 is a personal computer running display and data communication software. The dispatcher uses telephone 117 for voice communication with the drivers of the trucks.

LECs 103 and 121 are employed in the conventional manner to achieve connections to IXC network 105. It is noted that LECs 103 and 121 may be the same. IXC network 105 is employed to establish connections from truck 115 and dispatcher location 101 to wireless enhanced services complex 107. Wireless enhanced services complex 107 may be thought of as being located "in" or "behind" IXC network 105 as those terms are conventionally used in the art.

The conventional purpose of mobile telephone roaming clearing house 109 is to authenticate mobile telephone subscribers who are roaming outside of their home service area. One well known mobile telephone roaming clearing house is provided by GTE Telecommunications Services Incorporated (TSI). In particular, for the present application, mobile telephone roaming clearing house 109 receives a location indication from MSC 111 whenever a truck enters a new service area. This location indication is described further below. It is relayed by mobile telephone roaming clearing house 109 to wireless enhanced services complex 107. Despite being coarse, the location indication provides a first approximation of the location of the truck that has been found to be very useful in long haul trucking applications. Advantageously, it is provided at no additional cost to the trucking company using the truck location and communication system.

MSC 111 is used to establish mobile telephone communications with truck 115 via mobile base antenna tower 113. MSC 111 also transmits a location indication for truck 115 whenever truck 115 activates its mobile telephone within the area served by MSC 111. In particular, the location indication is provided in response to the transmission of a "*19" signal from the mobile telephone in truck 115 to MSC 111. Conventionally, in cellular telephone communication, the transmission of a *19 indicates a request to deactivate cellular roaming. MSC 111 forwards the "*19" signal to mobile telephone roaming clearing house 109 along with the mobile identification number (MIN) of the transmitting truck 115.

Mobile telephone roaming clearing house 109 is preprogrammed to recognize the MINs of mobile telephones used in trucks that are served by wireless enhanced services complex 107. When mobile telephone roaming clearing house 109 receives a *19 transmission from a mobile telephone having a MIN belonging to a truck served by a wireless enhanced services complex 107, mobile telephone clearing house 109 transmits a location indication update to wireless enhanced services complex 107 identifying the mobile service provider now serving truck 115 rather than performing the conventional cellular roaming deactivation.

Wireless enhanced services complex 107 includes a) control processor 123, b) dual local area network (LAN) 125, c) modem processors 127, d) modem banks 129 and e) switch fabric 131. Control processor 123 provides all the computational capability necessary to control the overall operation of wireless enhanced services complex 107. Control processor 123 contains memory 133 and code 135. Memory 133 is used to store information such as a list of trucks using the service as well as for temporary storage of data being communicated between the trucks and dispatcher location 101. Code 135 is used to store the computer instructions which operate control processor 123.

Dual LAN 125 provides connectivity between control processor 123, modem processors 127 and switch fabric 131. It is a dual LAN for reliability purposes. Modem banks 129 are each made up of one or more modems which are used to transmit and receive information over telephone lines. Modem processors 127 are each responsible for controlling the individual modems within the respective modem banks 129. Modem processors 127 also pass data between switch fabric 131 and control processor 123 via their respective one of modem banks 129 and dual LAN 125. Lastly, switch fabric 131 provides connections between telephone lines of IXC network 105 and the proper modem of modem banks 129. Switch fabric 131 can also connect together, i.e., bridge, two telephone lines from IXC network 105.

Figure 2:
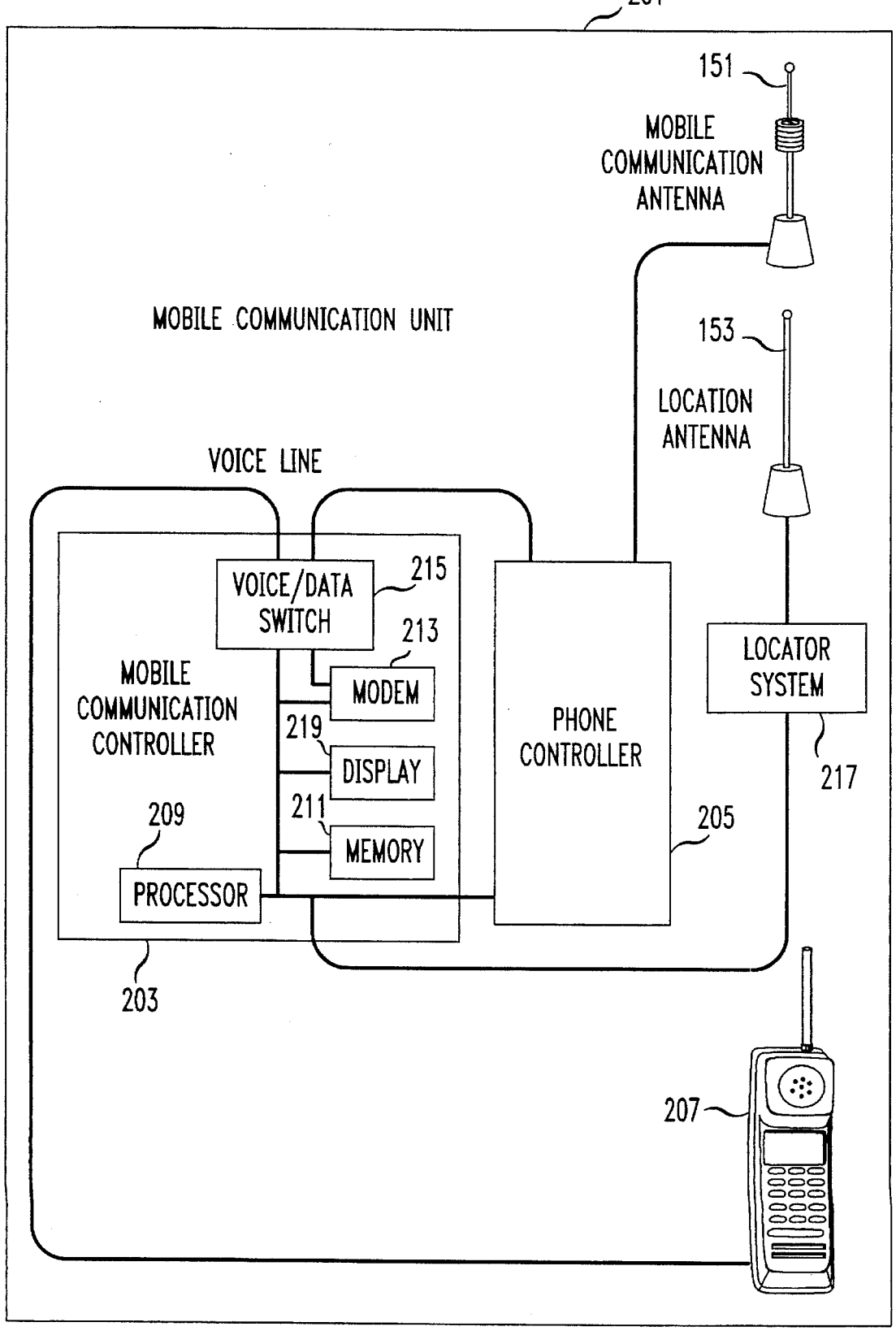
FIG. 2 shows an exemplary mobile communication unit used in the truck of FIG. 1.

FIG. 2 shows an exemplary mobile communication unit 201 used in truck 115 to communicate with wireless enhanced services complex 107 and ultimately dispatcher location 101. Mobile communication unit 201 includes a) mobile communication controller 203, b) phone controller 205, c) telephone handset 207, d) mobile communication antenna 151, e) locator system 217 and f) location antenna 153.

Mobile communication controller 203 includes 1) processor 209, 2) memory 211, 3) modem 213, 4) voice/data switch 215, and 5) display 219. Processor 209 provides all the computation capability necessary to control the overall operation of mobile communication unit 201. Modem 213 is used to convert data from processor 209 to a form suitable for transmission over a mobile telephone channel. Memory 211 stores, among other things, accumulated data for ultimate transmission to dispatcher location 101 as well as data received from dispatcher location 101. Data received from dispatcher location 101 is displayed for the driver of the truck on display 219.

Voice/data switch 215 is used to control the source that is connected to the mobile telephone channel. Either telephone handset 207 or modem 213 may controllably be given access to the mobile telephone channel. Voice/data switch 215 is responsive to commands from processor 209 to determine whether telephone handset 207 or modem 213 is given access to the mobile telephone channel.

Phone controller 205 provides the capability to transmit and receive communication over the mobile telephone channel. Phone controller 205 accesses the mobile telephone channel via mobile communication antenna 151.

Locator system 217 receives triangulation information via location antenna 153 to determine the precise location of truck 115. This information is stored in memory 211 for ultimate transmission to dispatcher location 101. Such locator systems are well known.

It is possible for the truck to become unavailable to participate in data transfers with dispatcher location 101 via wireless enhanced services complex 107. Such unavailability may result, for example, because 1) the truck, and all the equipment therein, has been turned off, e.g., the driver is out of the truck taking a break at a rest area, 2) the truck is in a location at which a wireless communications signal cannot be accessed, e.g., the truck is under an overpass or in a mountainous region, or out of range of any mobile base antenna tower 113. This unavailability condition may persist for an indefinite period of time. However, if the dispatcher or wireless enhanced services complex 107 continues to attempt to communicate with the truck additional costs will be incurred without any benefit.

Figure 3:
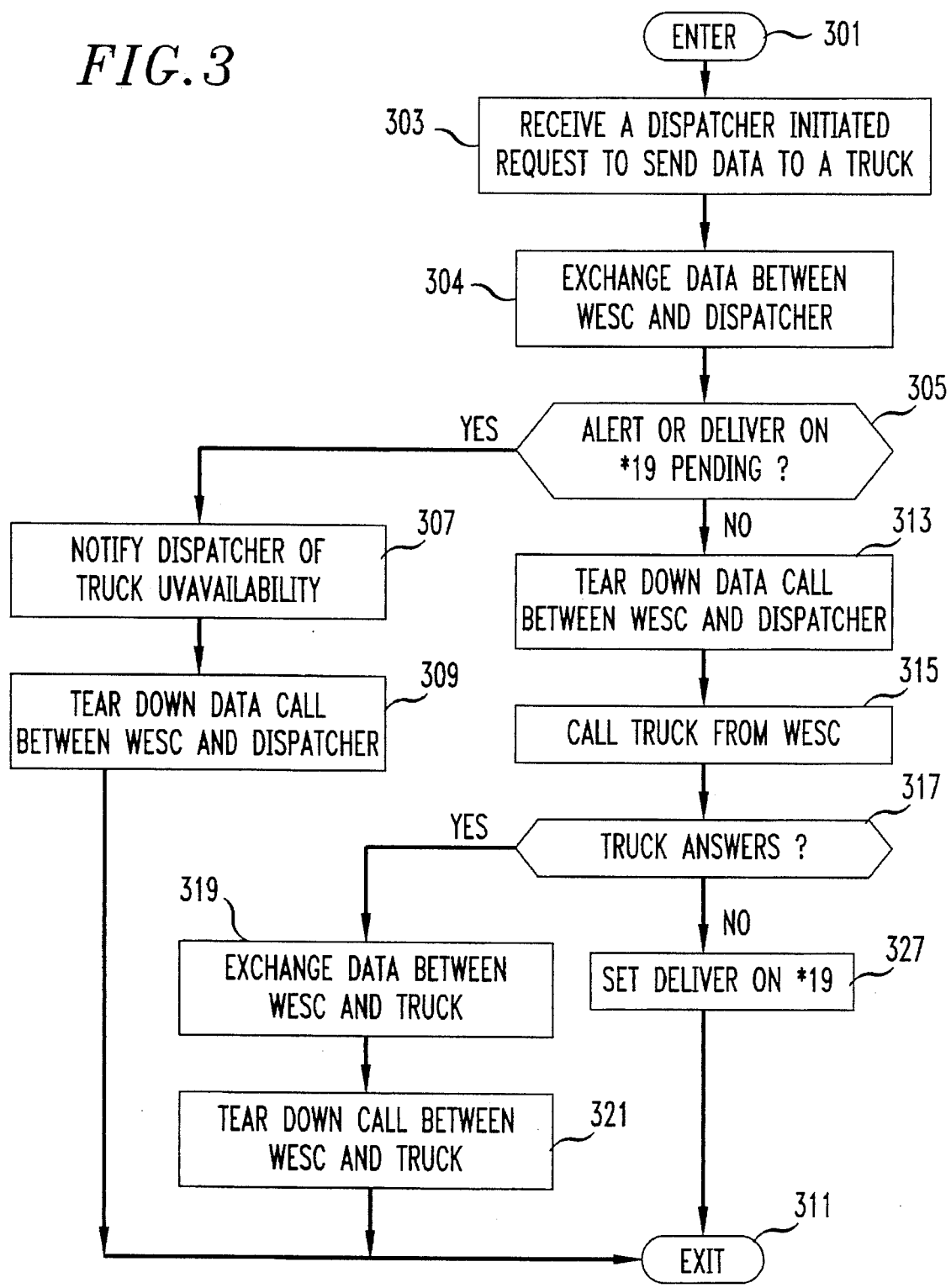
FIG. 3 shows an exemplary process which implements aspects of the invention in the context of the truck location and communication system of FIG. 1.

FIG. 3 shows an exemplary process which avoids the incurring of such additional costs, in accordance with the principles of the invention, by a) transmitting the data to be transmitted to a store and forward unit; b) marking as unavailable a wireless data station to which the store and forward unit could not successfully complete the data transmission; c) waiting for the wireless data station to register, i.e., signal its availability to receive data transmissions; and d) transmitting the data from the store and forward unit to the data station once a registration is received from the wireless data station.

The process is entered in step 301 when a data call is originated from terminal 119 at dispatcher location 101 requesting a data exchange with mobile unit 201 in truck 115. This data call is originated from terminal 119. The call passes through LEC 103 and IXC 105 and is received, in step 303 at wireless enhanced services complex 107. At wireless enhanced complex 107 the call passes to control processor 123 via switch fabric 131, a modem of modem bank 129, modem processor 127 and dual LAN 125. In step 304 data is exchanged between dispatcher location 101 and wireless enhanced services complex 107. Data received by wireless enhanced services complex 107 is stored in memory 133, in accordance with an aspect of the invention. It is noted that the data that is exchanged need not be solely associated with truck 115 but may be associated with any truck that communicates with dispatcher location 101.

Control processor 123 tests to determine, in step 305, if an "alert", or "deliver on *19" is pending. An "alert" is a stored indication that a previous attempt has been made to establish a voice communication telephone call with the particular truck 115 and that attempt was unsuccessful. A "deliver on *19" is a stored indication that a previous attempt has been made to deliver data to the particular truck and that attempt was unsuccessful. In accordance with the principles of the invention, if the test result in step 305 is YES, indicating that as of the last attempt to communicate with the truck it was unavailable, control passes to optional step 307, in which control processor 123 transmits a message back to dispatcher location 101 notifying the dispatcher that the truck is unavailable. The data call between wireless enhanced services complex 107 and terminal 119 at dispatcher location 101 is then disconnected, i.e., torn down, in step 309. The process is then exited in step 311.

If the test result in step 305 is NO, indicating that the truck has previously been available, control passes to step 313, in which the data call between terminal 119 at dispatcher location 101 and wireless enhanced services complex 107 is torn down. Next, in step 315, control processor 123 attempts to place a data call to truck 115. This data call is established via dual LAN 125, modem processor 127, a modem of modem bank 129, switch fabric 131, IXC network 105, LEC 121, MSC 111, and mobile base antenna tower 113. Control then passes to conditional branch point 317, which tests to determine if the truck has successfully received the call, i.e., the truck answered the call and a connection was successfully achieved to modem 213 (FIG. 2).

If the test result in step 317 is YES, indicating that the truck is now available for data communication, control passes to step 319, in which wireless enhanced services complex 107 exchanges data with truck 115, in accordance with an aspect of the invention. This is done by downloading to truck 115 any information stored in memory 133 for truck 115 and receiving from truck 115 any data stored in memory 211. Note that such information includes any information stored in memory 133 prior to the origination of the data exchange in step 301 as well as any information received at wireless enhanced services complex in step 304. Next, upon completion of the data exchange between wireless enhanced services complex 107 and truck 115, in step 321, the connection over which the data exchange took place is torn down. The process then exits in step 311.

If the test result in step 317 is NO, indicating the truck has become unavailable, control passes to step 327, in which wireless enhanced services complex 107 sets a "deliver on *19" for truck 115, in accordance with the principles of the invention. Doing so, advantageously, indicates to wireless enhanced services complex 107 that no attempt is to be made to contact truck 115 via IXC network 105, LEC 121, and MSC 111 until a registration, e.g., a "*19", indicating the availability of truck 115 to exchange data, is received. Again, a "deliver on *19" is a stored indication that a previous attempt has been made to deliver data to the particular truck and that attempt was unsuccessful. The process then exits in step 311.

Figure 4:
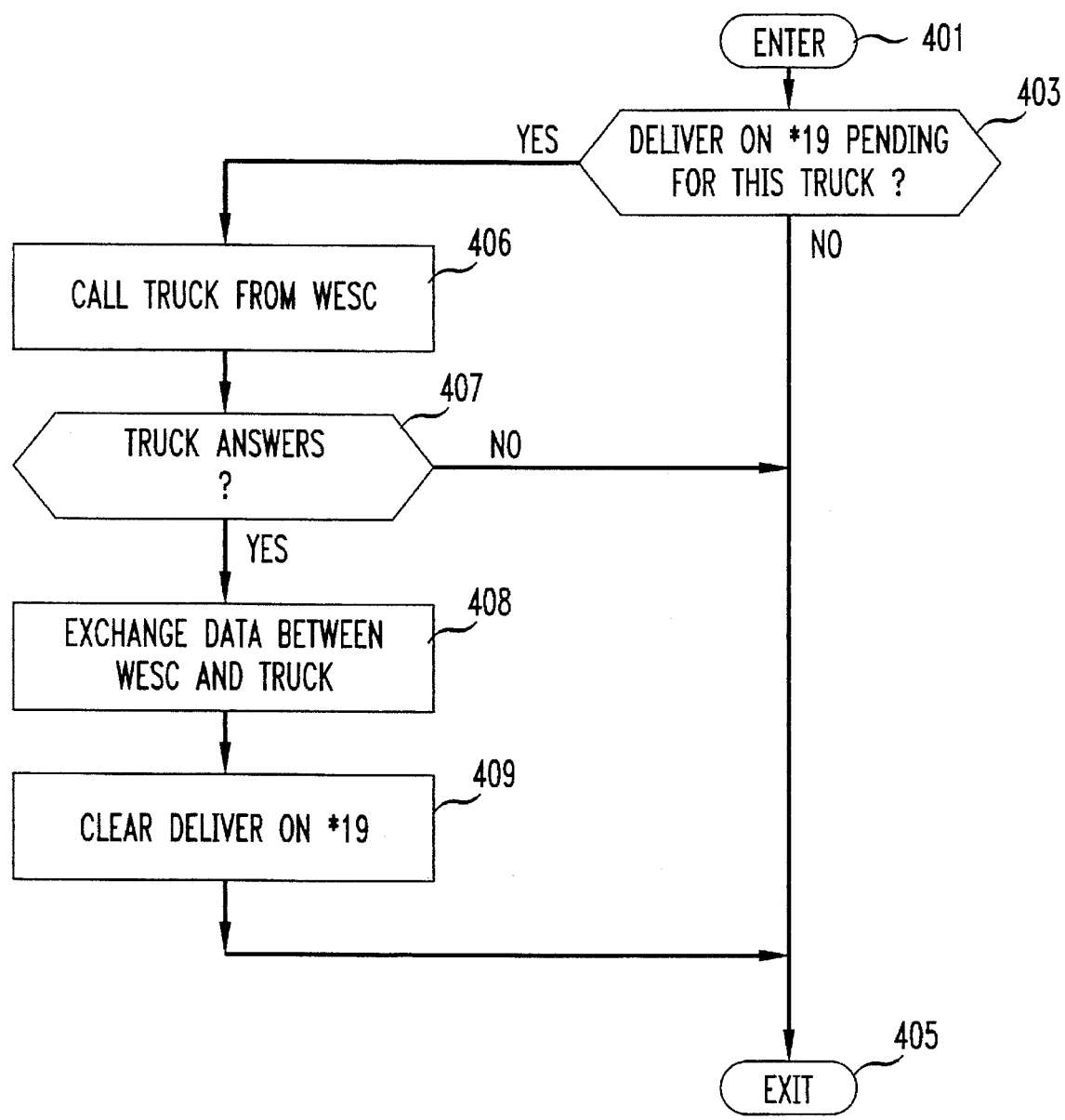
FIG. 4 shows an exemplary process performed in wireless enhanced services complex of FIG. 1 for clearing "deliver on *19" in accordance with the principles of the invention.

FIG. 4 shows an exemplary process performed in wireless enhanced services complex 107 for clearing "deliver on *19" in accordance with the principles of the invention. The process is entered in step 401 when a registration, e.g., a "*19", is received for a truck. In conditional branch point 403 wireless enhanced services complex tests to determine if a "deliver on *19" is pending for the truck for which the "*19" was just received. If the test result in step 403 is NO, in accordance with an aspect of the invention, control passes to step 405 and the process is exited. If the test result in step 403 is YES, indicating that the truck for which the "*19" just received had previously been unavailable, control passes to step 406.

In step 406, wireless enhanced services complex 107 attempts to establish a data call to mobile communication unit 201 in truck 115. Conditional branch point 407 then tests to determine if mobile communication unit 201 in truck 115 answers the data call and the data call is successfully established. If the test result in step 407 is NO, indicating that mobile communication unit 201 in truck 115 is still unavailable, control passes to step 405 and the process is exited. If the test result in step 407 is YES, indicating that the mobile communication unit 201 in truck 115 is available for data exchange, control passes to step 408 in which data is exchanged between wireless enhanced services complex 107 and mobile communication unit 201. Next, in step 409, the "deliver on *19" is cleared. In accordance with the principles of the invention, clearing the "deliver on *19" indicates that truck 115 remains available for further data communications. The process is then exited in step 405.

It is noted that, in accordance with an aspect of the invention, that when a "deliver on *19" is pending for truck 115, voice calls to truck 115 are optionally disallowed by wireless enhanced services complex 107.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A method for use in providing wireless data transmission, comprising the steps of:

receiving data to be transmitted at a store and forward unit;

attempting to transmit the data from said store and forward unit to a wireless data station;

marking as unavailable the wireless data station when the store and forward unit can not successfully complete the data transmission;

waiting for the wireless data station to register after it has been marked as unavailable; and transmitting the data from the store and forward unit to the data station once a registration is received from the marked wireless data station.

2. The invention as defined in claim 1 further including the step of queuing at the store and forward unit any data for transfer to the wireless data station received at the store and forwarding unit during said waiting step.

3. The invention as defined in claim 1 wherein no attempt is made to contact the wireless data station over the wireless service provider's network after said marking until a registration is received from said wireless data station.

4. A method for use in providing wireless data transmission, comprising the steps of:

receiving data to be transmitted at a store and forward unit;

attempting to transmit the data from said store and forward unit to a wireless data station;

marking as unavailable the wireless data station when the store and forward unit can not successfully complete the data transmission;

waiting for the wireless data station to register after it has been marked as unavailable; and transmitting the data from the store and forward unit to the data station once a registration is received from the marked wireless data station;

wherein the data station shares communication facilities with a wireless voice telephone and further including the step of disallowing any call attempts to the wireless telephone during the waiting period.

5. A method for use in providing wireless data transmission, comprising the steps of:

transmitting data to be transmitted to a store and forward unit;

attempting to transmit the data from said store and forward unit to a wireless data station;

marking as unavailable the wireless data station when the store and forward unit can not successfully complete the data transmission;

waiting for the wireless data station to signal its availability to receive data transmissions after it has been marked as unavailable; and transmitting the data from the store and forward unit to the marked data station only after a registration is received from the wireless data station.

6. The invention as defined in claim 5 further including the step of queuing at the store and forward unit any data for transfer to the wireless data station received at the store and forwarding unit during said waiting step.

7. The invention as defined in claim 5 wherein no attempt is made to connect to the wireless data station over the wireless service provider's network after said marking until registration is received.

8. The invention as defined in claim 5 further including the step of marking said wireless data station as available.

9. The invention as defined in claim 5 further including the step of receiving a registration from said wireless data station.

10. A method for use in providing wireless data transmission, comprising the steps of:

transmitting data to be transmitted to a store and forward unit;

attempting to transmit the data from said store and forward unit to a wireless data station;

marking as unavailable the wireless data station when the store and forward unit can not successfully complete the data transmission;

waiting for the wireless data station to signal its availability to receive data transmissions after it has been marked as unavailable; and transmitting the data from the store and forward unit to the marked data station only after a registration is received from the wireless data station;

wherein the data station shares communication facilities with a wireless voice telephone and no attempt is made to contact the wireless telephone over the wireless service provider's network for any call attempts to the wireless telephone during the waiting period.

11. A method for use in a vehicle location and communications system, comprising the steps:

receiving from a requester a request to transmit data to a vehicle;

receiving said data from said requester at a store and forward system;

determining that said vehicle was unavailable at the time that an immediately preceding request to communicate with said vehicle was made and that said vehicle has not registered since then;

waiting for said vehicle to register; and attempting to transmit said data to said vehicle from said store and forward system upon receipt of a registration signal from said vehicle.

12. The invention as defined in claim 11 wherein said vehicle is a truck.

13. Apparatus in a telephone network for use in providing wireless data transmission from a base station to a wireless data station, comprising:

a store and forward unit for receiving from said base station data for transmission;

means for transmitting said data from said store and forward unit to a wireless data station over a wireless connection;

means for marking said wireless data station as unavailable when said wireless data station cannot be successfully connected to; and means for inhibiting said means for transmitting from transmitting to said wireless data station when said wireless data station is marked as unavailable.

14. The invention as defined in claim 13 further including:

means for receiving a registration signal from said wireless data station after it has been marked as unavailable; and means responsive to said received registration for marking said wireless data station as available.

15. The invention as defined in claim 13 further including:

means for receiving a registration signal from said wireless data station after it has been marked as unavailable;

means responsive to said received registration for initiating a connection to said wireless data station;

means for marking said wireless data station as available if said connection is successfully established.

* * * * *